US012118125B1

(12) United States Patent
Kothari et al.

(10) Patent No.: US 12,118,125 B1
(45) Date of Patent: Oct. 15, 2024

(54) METHOD OF CONSORTIUM HASHING

(71) Applicant: Unit21, Inc., San Francisco, CA (US)

(72) Inventors: Trisha Kothari, San Francisco, CA (US); Jay Crumb, San Francisco, CA (US); Christopher Benjamin James Walton, San Francisco, CA (US); Quinn Flagg, San Francisco, CA (US); Clarence Chio, San Francisco, CA (US); Dhiraj Bhat, San Francisco, CA (US)

(73) Assignee: Unit21, Inc., San Francisco, CA (US)

( * ) Notice: Subject to any disclaimer, the term of this patent is extended or adjusted under 35 U.S.C. 154(b) by 0 days.

(21) Appl. No.: 18/438,197

(22) Filed: Feb. 9, 2024

Related U.S. Application Data

(63) Continuation of application No. 18/536,591, filed on Dec. 12, 2023.

(51) Int. Cl.
*G06F 21/62* (2013.01)

(52) U.S. Cl.
CPC ...... *G06F 21/6254* (2013.01); *G06F 21/6209* (2013.01)

(58) Field of Classification Search
CPC .............. G06F 21/602; G06F 21/606; G06F 21/62–6227; G06F 21/6245–6272; H04L 63/0428–045; H04L 63/0471
See application file for complete search history.

(56) References Cited

U.S. PATENT DOCUMENTS

| | | | | |
|---|---|---|---|---|
| 2008/0147553 A1* | 6/2008 | Orner | ..................... | G06Q 30/02 |
| | | | | 707/E17.116 |
| 2016/0147945 A1* | 5/2016 | MacCarthy | ........... | H04W 12/02 |
| | | | | 705/51 |
| 2019/0087589 A1* | 3/2019 | Eliazar | ................ | G06F 21/6245 |
| 2020/0076578 A1* | 3/2020 | Ithal | ..................... | H04L 63/0272 |

* cited by examiner

*Primary Examiner* — Kevin Bechtel
(74) *Attorney, Agent, or Firm* — Anooj Patel; Kevin Schraven; Hankin Patent Law, APC (57) ABSTRACT

A method of sharing Personal Identifying Information comprising; inputting one or more PII fields into a search institution to be matched; normalizing one or more fields of PII data by converting to a standard format; generating one or more fields of PII data are combined; creating a Bloom filter, Bloom filter concatenates the combined one or more fields of PII; MurmurHashing concatenated combined one or more fields of PII are multiplied by one or more constants, then rotated, then divide by thirty-two; Base64encoding, wherein each Bloom filter combinations are counted and converted to an ASCII binary format, converted combinations are divided into six characters and a decimal value; matching six characters and the decimal value are hashed with a secret key, then hash a second time with a hash function, then mix with the secret key, then hash for a third time with a hash function, then output a result.

9 Claims, 5 Drawing Sheets

METHOD OF CONSORTIUM HASHING

CROSS-REFERENCE TO RELATED APPLICATIONS

This Patent Application is a Continuation of U.S. patent application Ser. No. 18/536,591, titled Method of Consortium Hashing filed on Dec. 12, 2023, the contents of which are expressly incorporated herein by this reference as though set forth in their entirety and to which priority is claimed.

FIELD OF USE

The present disclosure relates, in general, to methods and systems of sharing information via a semi-trusted central processor between multiple parties. More specifically, the present disclosure relates to sharing the personal, business, and/or banking information of customers or users without exposing raw data to the matching service and without requiring a shared key to be distributed among contributors.

BACKGROUND

Generally, Privacy-Preserving Record Linkage ("PPRL") is a data integration technique that connects records from different sources while maintaining the privacy of individuals. PPRL uses algorithmic techniques to match records by matching personally identifiable information (PII) attributes without revealing them.

PPRL works by encrypting or masking PII used for person-level matching. For example, PPRL can link patient records to the National Death Index ("NDI"). PPRL can also be used to track the vaccinated population in the U.S. in a fully de-identified and Health Insurance Portability and Accountability Act ("HIPAA") compliant manner.

PPRL relies on data partners who use an encryption key.

Typical PPRL methods require either a trusted third party to which participants send plaintext records (thus exposing PII to the central matching service) or matching symmetric key distribution to all participating parties. In the former case, all parties have to trust the central authority with full access to their data; in the latter case, a compromise of any participating party is equivalent to compromising all parties.

What is needed is Consortium hashing methods and systems that increase the attack cost of a dishonest matching service by processing the plaintext data on the participant's machine before upload and not disclosing the exact fields used to generate the input. Preferably, such consortium hashing systems would mitigate attacks against each participant by using a single cryptographic key stored in an HSM by the matching service.

SUMMARY

To minimize the limitations in the prior art, and to minimize other limitations that will become apparent upon reading and understanding the present specification, the present disclosure discloses new and useful methods and systems for sharing personal, business, and/or banking information of customers or users without exposing raw data to the matching service and without requiring a shared key to be distributed among contributors. The methods and systems of the present disclosure may allow, for example, two financial institutions to see what customers they have in common without allowing the matching service to know who those customers are and without allowing other users of the matching service to know who those customers are unless one or more of the other users have a matching customer within a degree of certainty. The present disclosure may also allow two financial institutions to see what payment methods (such as bank accounts/routing numbers) they have in common without allowing the matching service to know what the account number(s) are and without allowing other users of said matching service to know the account number(s) are unless one or more of the other users have a matching payment method within a degree of certainty.

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

One embodiment may be a method of sharing Personal Identifying Information ("PII") comprising the steps; inputting, by a search institution, one or more fields of PII data to be matched; normalizing the one or more fields of PII data into a standard format; generating, from the one or more fields of PII data that has been converted into the standard format, one or more data combinations of the PII data; creating a Bloom filter, wherein the Bloom filter concatenates the one or more data combinations of the PII data; hashing the one or more concatenated data combinations of the PII data by multiplying the data combinations of the PII data, such that one or more Bloom filter combinations are created; encoding each of the one or more Bloom filter combinations, such that one or more converted combinations are created; sending the one or more converted combinations to a matching service; hashing by a private key the one or more converted combinations, wherein the private key may be stored by the matching service; matching, by the matching service, the one or more hashed converted combinations with a stored hashed file, wherein the stored hashed file may be stored on the matching service; and reporting, by the matching service, to the search institution whether the hashed converted combinations match any of the stored hashed file. In some embodiment the PII may comprise one or more of: a social security number, a full name, an email address, a phone number, a passport information, a driver's license number, a financial account number, and a credit card number. In some embodiments, the standard format comprises: a name, wherein one or more characters of the name are converted to lowercase and any spaces are removed; a date of birth, wherein the date of birth may comprise a year, a month, and a day, wherein the year may be a four-digit year, wherein the month may be a two-digit month, and wherein the day may be a two-digit day, and wherein the date of birth may be formatted as year, month, day; a phone number, wherein any non-numerical characters are removed; an email address, wherein the email address may comprise a plurality of characters, wherein the characters are converted to lowercase characters; a social security number, wherein any non-numerical characters of the social security number are removed; a bank account number, wherein any non-numerical characters of the bank account number are removed; and a routing number, wherein any non-numerical characters of the routing number are removed. In some embodiments, the generating may comprise an algorithm that generates the one or more combined fields of PII, such that one or more combined fields of PII comprise all possible combinations of the one or more fields of PII data. In some embodiments, the private key may be a HMAC-SHA256 type key. In some embodiments, hashing the one or more concatenated data combinations may comprise a MurmurHashing protocol. In some embodiments, the encoding each of the one or more Bloom filter combinations may comprise a Base64encoding protocol. In some embodiments, the search institution may be a financial technology company, financial institution, or crypto exchange.

The Consortium hashing systems and methods of the present disclosure breaks down partial sets of identifying information about a user into Bloom filters, then hashed with a private key held by the semi-trusted matching service. The approach builds on existing Privacy-Preserving Record Linking (PPRL), Private Set Intersection, and Multi-Match Key PPRL methods. Consortium hashing uses PII information such as a person's name (first and last), date of birth, phone number, email address, social security number, and last four digits of their social security number (or some subset of those fields). Consortium hashing may be used on any other set of data, such as financial information, bank routing information, and bank account numbers.

Consortium hashing provides a way for financial technology companies ("fintechs"), financial institutions, crypto exchanges, and other related companies to exchange information about known bad actors, such as financial criminals, in a privacy-preserving way without the need for a completely trusted third-party processor or shared key infrastructure.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

In the following detailed description of various embodiments of the present disclosure, numerous specific details are set forth in order to provide a thorough understanding of various aspects of one or more embodiments of the present disclosure. However, one or more embodiments of the present disclosure may be practiced without some or all of these specific details. In other instances, well-known methods, procedures, and/or components have not been described in detail so as not to unnecessarily obscure aspects of embodiments of the present disclosure.

While multiple embodiments are disclosed, still other embodiments of the devices, systems, and methods of the present disclosure will become apparent to those skilled in the art from the following detailed description, which shows and describes illustrative embodiments of the devices, systems, and methods of the present disclosure. As will be realized, the devices, systems, and methods of the present disclosure are capable of modifications in various obvious aspects, all without departing from the spirit and scope of the present disclosure. Accordingly, the screenshot figures, and the detailed descriptions thereof, are to be regarded as illustrative in nature and not restrictive. Also, the reference or non-reference to a particular embodiment of the devices, systems, and methods of the present disclosure shall not be interpreted to limit the scope of the present disclosure.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-40% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Furthermore, the one or more versions may be implemented as a method, apparatus, or article of manufacture using standard programming and/or engineering techniques to produce entirely hardware embodiment, an entirely software embodiment, or an embodiment combining software and hardware embodiments. Furthermore, the systems and methods may take the form of Non-transitory computer readable media. More particularly, the present methods and systems may take the form of web-implemented computer software or a computer program product. Any suitable computer-readable storage medium may be utilized including, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick).

Those skilled in the art will recognize many modifications may be made to this configuration without departing from the scope of the disclosed embodiments.

Embodiments of the systems and methods are described below with reference to schematic diagrams, block diagrams, and flowchart illustrations of methods, systems, apparatuses, and computer program products. It will be understood that each block of the block diagrams, schematic diagrams, and flowchart illustrations, and combinations of blocks in the block diagrams, schematic diagrams, and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

In the following description, certain terminology is used to describe certain features of the various embodiments of the device, method, and/or system. For example, as used herein, the terms "computer" and "computer system" generally refer to any device that processes information with an integrated circuit chip and/or central processing unit (CPU).

As used herein, the terms "software" and "application" refer to any set of machine-readable instructions on a machine, web interface, and/or computer system" that directs a computer's processor to perform specific steps, processes, or operations disclosed herein.

As used herein, the term "computer-readable medium" refers to any storage medium adapted to store data and/or instructions that are executable by a processor of a computer system. The computer-readable storage medium may be a computer-readable non-transitory storage medium and/or any non-transitory data storage circuitry (e.g., buggers, cache, and queues) within transceivers of transitory signals. The computer-readable storage medium may also be any tangible computer readable medium. In various embodiments, a computer readable storage medium may also be able to store data, which is able to be accessed by the processor of the computer system.

As used herein, the term "Base64encoded" refers to a function that manipulates all string data types (BIT, BLOB, and CHARACTER).

As used herein, the term "Bloom filter" refers to a probabilistic data structure based on hashing.

As used herein, the term "concatenating" refers to joining data character strings end-to-end.

As used herein, the term "dictionary attack" refers to an attempted illegal entry to a computer system that uses a dictionary headword list to generate possible entries.

As used herein, the term "encryption key" refers to a typically random string of bits generated specifically to scramble and unscramble data.

As used herein, "hashing" refers to transforming any given key or a string of characters into another value.

As used herein, the term "MurmurHash" refers to a non-cryptographic hash function used for general hash-based lookups.

As used herein, the term "exclusive OR" or "XOR" refers to a Boolean logic operation that is widely used in cryptography as well as in generating parity bits for error checking and fault tolerance.

As used herein, the term "Personal Identifying Information" or "PII" refers to any representation of information that permits the identity of an individual to whom the information applies to be reasonably inferred by either direct or indirect means.

As used herein, the term "Privacy-Preserving Record Linkage" or "PPRL" refers to a linking methodology that mitigates privacy concerns when linking person-level data from disparate data sources.

As used herein, the term "rotation" or "bit rotation" refers to an operation similar to shift except that the characters or bit that fall off at one end are put back to the other end.

As used herein, the term "shifting" or "bit shifting" refers to moving each character in a set of data to the left or right. Typically, the last character or bit in the direction of the shift is lost, and a null character or 00 bit is inserted on the other end.

The Consortium hashing methods and systems of the present disclosure provides a way for financial technology companies ("fintechs"), financial companies, crypto exchanges, and other related companies to exchange information about known bad actors, such as financial criminals, in a privacy-preserving way without the need for a completely trusted third-party processor or shared key infrastructure.

The present disclosure may be utilized in other industries not specifically referenced in this disclosure. The disclosure may be used in any situation where there is a need for two or more parties to share data without exposing the data directly to either participants or a trusted third party where applicable. By adapting both the data normalization and protocol portions of the system to match the "shape" of data that they wish to share, any party may use this disclosure as a method to share data in a privacy-preserving manner.

Figure 1:
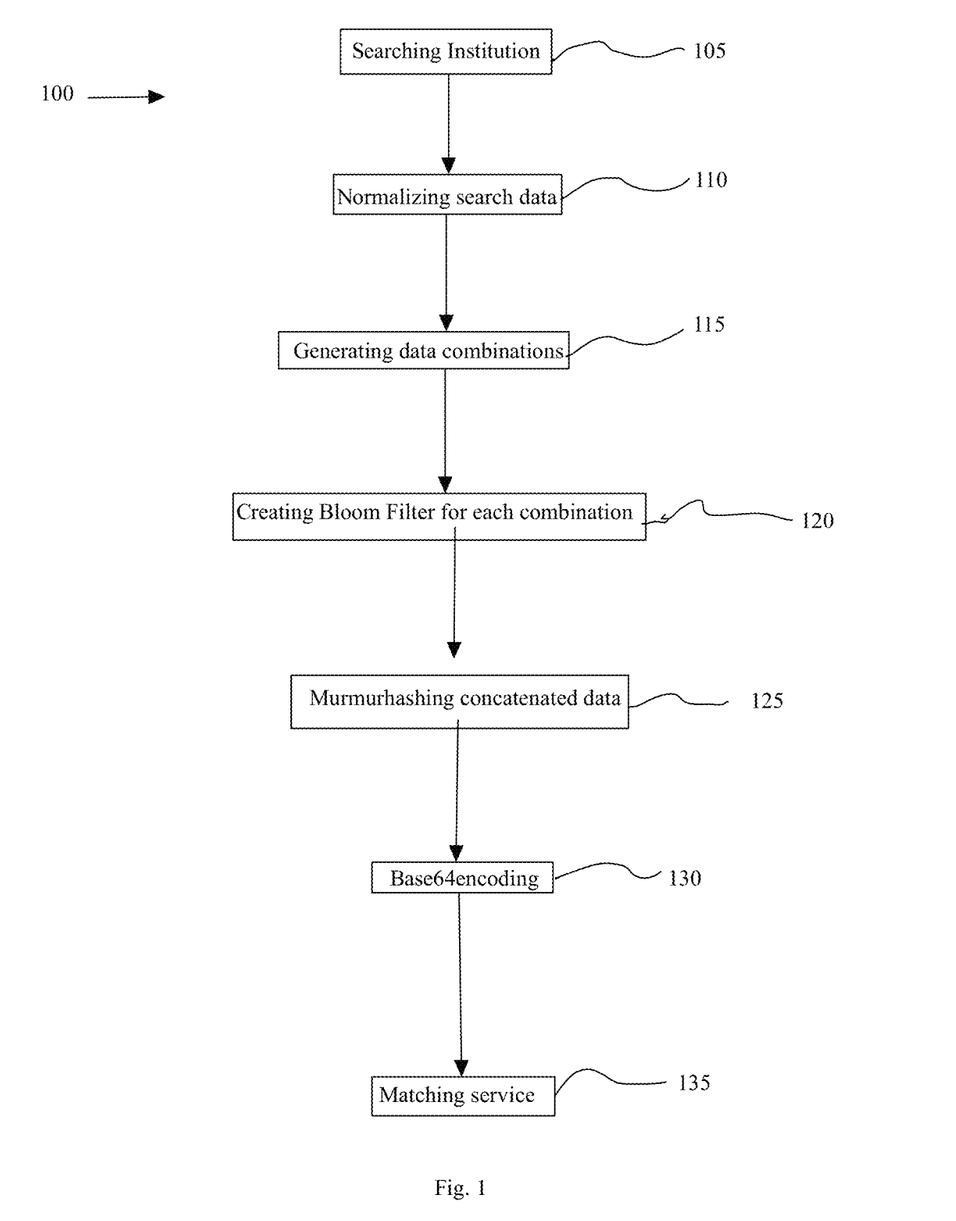
FIG. 1 is a block flow diagram of one embodiment of a method of Consortium hashing.

FIG. 1 is a block flow diagram of one embodiment of a method of Consortium hashing. Consortium Hashing 100 may be a method for sharing personal, business, and/or banking information of customers or users without exposing raw data to the matching service and without requiring a shared key to be distributed among contributors. Consortium Hashing 100 may comprise search institution inputting 105, normalizing search data 110, generating data combinations 115, creating Bloom filter for each combination 120, MurmurHashing concatenated data 125, base64encoding 130, and matching service 135.

First step: a search institution inputting 105 individuals' Personally Identifying Information ("PII") to be searched. PII can be used to distinguish one person from another or to deanonymize previously anonymous data. Examples of PII may include, but are not limited to, social security number, full name, email address, phone number, passport information, driver's license number, financial account numbers, banking account numbers, bank routing numbers, and/or credit card numbers. Information such as business phone numbers, race, religion, gender, workplace, and job titles are typically not considered PII. PII is often a target for identity thieves, and privacy laws may regulate the handling of PII data. Such privacy laws aim to give individuals control over how their data is used and to protect individuals from unwarranted invasions of their privacy.

Second step: normalizing search data 110 may be the process of organizing PII data in a standard form. Normalizing search data 110 may eliminate redundant PII data, minimize PII data modification errors, and simplify the query process. Repeated information may be present before normalizing search data 110, causing additional query time. Removal of redundant data may reduce and improve query response time.

Modification errors may be present prior to normalizing search data 110 and may be removed during normalization search data 110. A user may input an error when adding, updating, or deleting information input into normalizing search data 110. Normalizing search data 110 may help ensure that any new data may be entered correctly, without duplication or false entry, while allowing for the deletion of information without affecting any other data.

Normalizing search data 110 organizes and formats PII data into specific data type formats, as identified in the following table. All Names will be converted to lowercase, date of birth in a year-month-day, all non-numerical characters removed from phone numbers, lowercase email address, and remove non-numerical characters from any form of social security number.

TABLE 1

| Field | Format | Example | Example Encoded |
|---|---|---|---|
| First Name, Last Name | lower case | Benjamin | benjamin |
| Date of Birth | YYYY-MM-DD | Jan. 10th, 1967 | 1967 Jan. 10 |
| Phone Number | Leading 1, only numbers | +1 (929) 250 7018 | 19292507018 |
| Email address | All lowercase | ben@unit21.ai | ben@unit21.ai |
| SSN | All numbers | 590-03-4312 | 590034312 |
| Last 4 SSN | All numbers | 4312 | 4312 |

It should be understood that the PII listed in Table 1 above are only examples. PII may include, but are not limited to, social security number, full name, email address, phone number, passport information, driver's license number, financial account numbers, banking account numbers, bank routing numbers, and/or credit card numbers.

Third step: generating data combinations 120 often used to explore different combinations of features, items, or parameters within a data set. Generating data combination 120 using an algorithm may generate all possible combinations of a given data set. As shown in the examples below, three data field combinations are explored. Each data set may have several combinations expressed by the following equation:

$$C(n,r)=(n!)/[(r!)\times(n-r)!]$$

Where "n" represents the number of fields to be combined and "r" represents the number of parameters in any given set of data. The greater combinations may increase query time but also increase accuracy. A fewer number of combinations may decrease query time but come at the risk of providing false return data.

TABLE 2

| Field 1 | Field 2 | Field 3 |
|---|---|---|
| Full SSN | First Name | Last Name |
| Full SSN | Last Name | Date of Birth |

TABLE 2-continued

| Field 1 | Field 2 | Field 3 |
| --- | --- | --- |
| Full SSN | Last Name | Phone Number |
| Full SSN | Last Name | Email Address |
| Full SSN | Date of Birth | Phone Number |
| Full SSN | Date of Birth | Email Address |
| Last 4 SSN | Last Name | Date of Birth |
| Last 4 SSN | Last Name | Phone Number |
| Last 4 SSN | Last Name | Email Address |
| Last Name | Date of Birth | Phone Number |
| Last Name | Date of Birth | Email Address |
| Date of Birth | Phone Number | Email Address |

TABLE 3

| Field 1 | Field 2 | Field 3 | Field 4 |
| --- | --- | --- | --- |
| Bank Routing Number | First Name | Last Name | |
| Bank Routing Number | Last Name | Date of Birth | |
| Bank Routing Number | Last Name | Phone Number | |
| Bank Routing Number | Last Name | Email Address | |
| Bank Routing Number | Date of Birth | Phone Number | |
| Bank Routing Number | Date of Birth | Email Address | |
| Bank Account Number | Last Name | Date of Birth | |
| Bank Account Number | Last Name | Phone Number | |
| Bank Account Number | Last Name | Email Address | |
| Credit Card Number | Date of Birth | Phone Number | |
| Credit Card Number | Date of Birth | Email Address | |
| Bank Routing Number | Bank Account Number | Bank Sub-Account Number (if exists) | |
| Bank Routing Number | Bank Account Number | Bank Sub-Account Number (if exists) | Email |
| Bank Routing Number | Bank Account Number | Bank Sub-Account Number (if exists) | Phone |
| Bank Routing Number | Bank Account Number | Bank Sub-Account Number (if exists) | Full Name |
| Bank Routing Number | Bank Account number | Bank Sub-Account number (if exists) | First Name |
| Bank Routing Number | Bank Account Number | Bank Sub-Account Number (if exists) | Last Name |
| Bank Routing Number | Bank Account Number | Bank Sub-Account Number (if exists) | Date of Birth |
| Credit Card Number | Phone Number | Email Address | |

It should be understood that the PII combinations listed in Tables 2 and 3 above are only examples. PII may include, but are not limited to, social security number, full name, email address, phone number, passport information, driver's license number, financial account numbers, banking account numbers, bank routing numbers, and/or credit card numbers.

Fourth step: creating a Bloom filter for each combination 120 by concatenating the normalized data for each combination. A Bloom filter may be a probabilistic data structure that may be used to determine if an element is in a data set. Creating a Bloom filter for each combination 120 may provide faster and more efficient queries. Creating a Bloom filter for each combination 120 may be used to add elements to a set and test if an element is in a set. Instead of searching specific PII data fields, a Bloom filter may add elements themselves to the data set, such as concatenating normalized data. Bloom filters may be useful when searching for data that might not exist in a data set. Bloom filters may definitely tell if an element is not present.

Fifth Step: MurmurHashing concatenated data 125 may be the process of taking normalized and concatenated data and then hashing via MurmurHashing. murmur Hash concatenated data 125 may be a non-cryptographic hash function that may be used for general hash-based lookups. MurmurHashing may preferably be used over other hashing methods because it may increase the likelihood of hash collisions and introduce a degree of uncertainty in matches (essential for privacy guarantees). MurmurHashing is, generally, fast and efficient and has a low collision rate. A typical MurmurHash concatenated data 125 algorithm may consist of multiplying normalized concatenated data by two constants (C1 and C2), rotating it left by a certain number of bits (R1), and XOR the result with the hash value (initially set to a seed value). A seed parameter may be a means to randomize the hash function. The product of multiplying normalized concatenated data by two constants may then be divided by thirty-two (32). The remainder of this calculation controls which bit in the Bloom filter to turn on. An empty Bloom filter may be a bit array of "m m m" bits, all initially set to zero. A bit array may be a data structure with each position in the array set to 0 or 1. A Bloom filter may also include a set of "k k k" hash functions. Hash functions must all have a range of 0 to m−1. If these hash functions match an incoming value with an index in the bit array, the Bloom filter will ensure the bit at that position in the array is 1.

Sixth step: Base64encoding 130 each Bloom filter combination. In order to Base64encoding 130, each Bloom filter combination character may be counted and converted to an ASCII binary format using an ASCII table. The converted ASCII binary formatted data may then be divided into chunks of 6 bits and then a decimal number. Finally, assign a Base64encoded character for each decimal value.

Seventh step: matching service 135 may hash the Base64encoding 130 decimal number with a private key (HMAC-SHA256) in order to prevent a dictionary attack of the encoded Bloom filter. HMAC-SHA256 may be a type of keyed hash algorithm that may be constructed from a hash function and used as a Hash-based Message Authentication Code ("HMAC"). The HMAC process mixes a secret key with the message data, hashes the result with the hash function, mixes that hash value with the secret key again, and then applies a hash function a second time. The output hash may typically be 256 bits in length. An HMAC can be used to determine whether a message sent over an insecure channel has been tampered with, provided that the sender and receiver share a secret key. The sender computes the hash value for the original data and sends both the original data and hash value as a single message. The receiver recalculates the hash value on the received message and checks that the computed HMAC matches the transmitted HMAC. An HMAC-SHA256 key may be stored by the matching service in a Hardware Security Module ("HSM").

A hardware security module ("HSM") may be a physical device that provides extra security for sensitive data. HSMs may be used to generate, protect, and manage keys used for encryption and decryption. Security integrity may be greater if the generated values of each combination field are not sent to the matching service with the encoded Bloom filter values. Not sending the generated values of the combination fields may enhance the system's privacy by preventing the matching service from knowing exactly which fields matched between PII data.

In order to check whether a person exists in the shared data set, a consumer creates a set of encoded Bloom filters via the same process and sends the output to the matching service 135. The matching service then hashes each one and returns a positive or negative result depending on whether any two hashes match with an existing record set. Because no field order is provided to the matching service and only a binary yes/no result is returned to the client, it is impossible for the matching service or client to know the data within the fields.

Matching service 135 may only use the protocol portion of the system in order to dictate what participants may send and what results may be returned.

Figure 2:
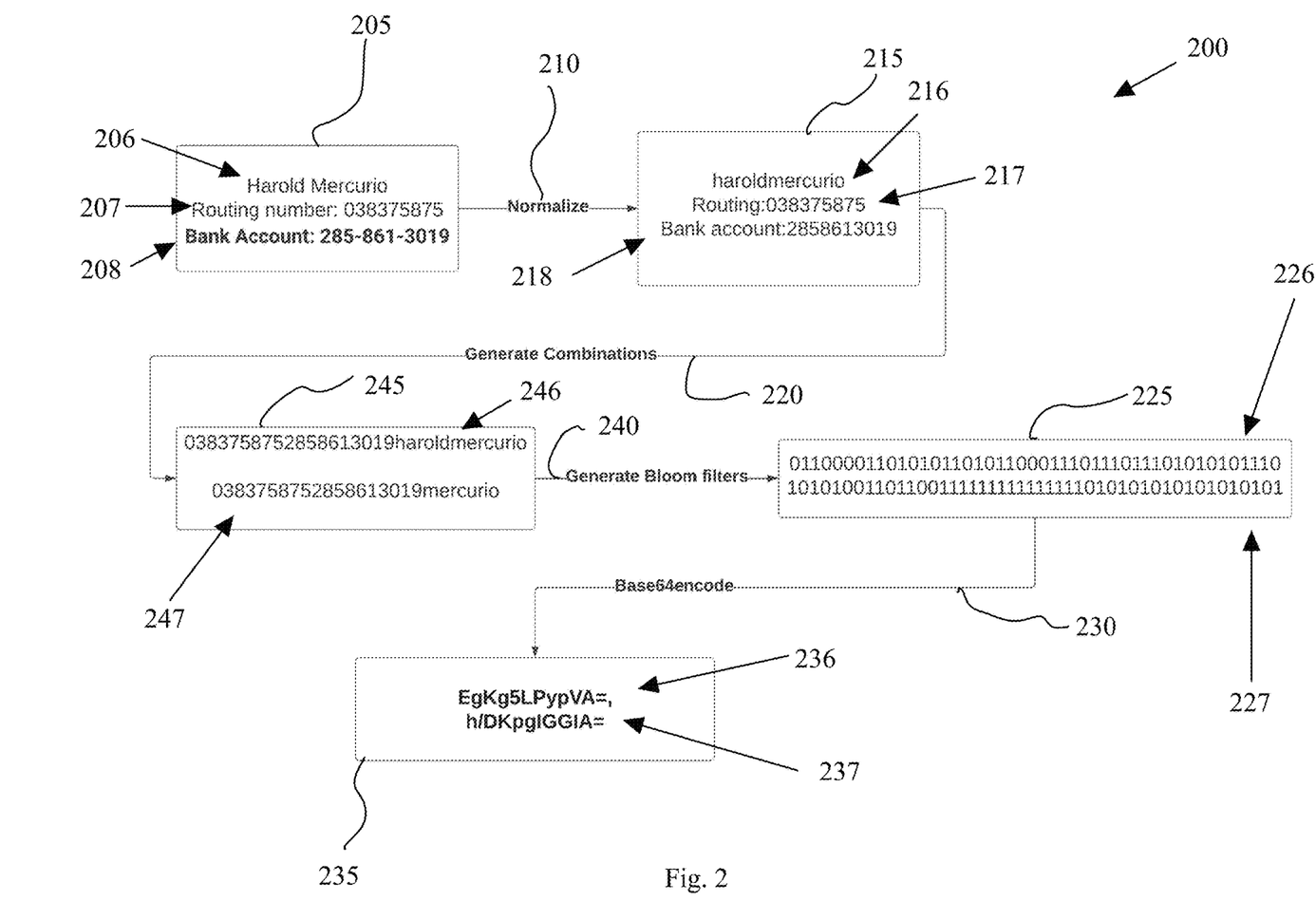
FIG. 2 is an illustration of one embodiment of client-side hashing generation.

FIG. 2 is an illustration of one embodiment of client-side hashing generation. Client-side generation 200 may comprise inputting data 205, normalizing data 210, generating combinations 220, generating Bloom filters 240, and base64 encoding 230. As shown in FIG. 2, inputting data 205 may comprise name 206, social security number ("SSN") (not shown), routing number 207, bank account number 208 and date of birth (not shown). Name 206 may comprise any combination of any one or more first, middle, and last names. Routing number 207 may comprise a full nine-digit number, or a portion thereof. Bank account number 208 may comprise a full number between 9 and 12 digits, the last four digits of the full value, or another portion of the full number. SSN may comprise either a nine-digit number or a four-digit number. Date of birth may be entered in any typical format.

Normalizing 210 may convert data as shown in converted data 215. Converted data 215 may comprise converted name 216, converted routing number 217, and converted bank account number 218. Converted name 216 may preferably be in all lowercase characters, no spaces, first name first, middle name or initial second, and last name last. routing number 217 may preferably remove any non-numerical numbers, and a four-digit SSN may have proceeding zeros entered for a total of nine digits. Converted bank account number 218 may convert all alphanumerical characters to numerical characters and insert a hyphen between year, month, and day.

It should be understood that the PII detailed in FIG. 2 are only examples. PII may include, but are not limited to, social security number, full name, email address, phone number, passport information, driver's license number, financial account numbers, banking account numbers, bank routing numbers 207, and/or credit card numbers.

Generating combinations 220 using a combinatorial algorithm to generate all possible combinations 245 of converted name 216, routing number 217, and converted bank account number 218. All possible combinations 245 may comprise converted routing number-bank account number-name 246 and converted routing number-bank account number-last name 247. Although only two combinations are referenced here, there may be several combinations based on the formula:

$$C(n,r)=(n!)/[(r!)\times(n-r)!]$$

Generating Bloom filters 240 produces concatenated normalized data 225. Concatenated normalized data 225 may comprise concatenated combination one 226 and concatenated combination two 227, all shown in binary.

Base64encode 230 may generate a Base64encoded character for each decimal value 235. Base64encoded characters for each decimal value 235 ("BCDV") may comprise BCDV one 236 and BCDV two 237.

Figure 3:
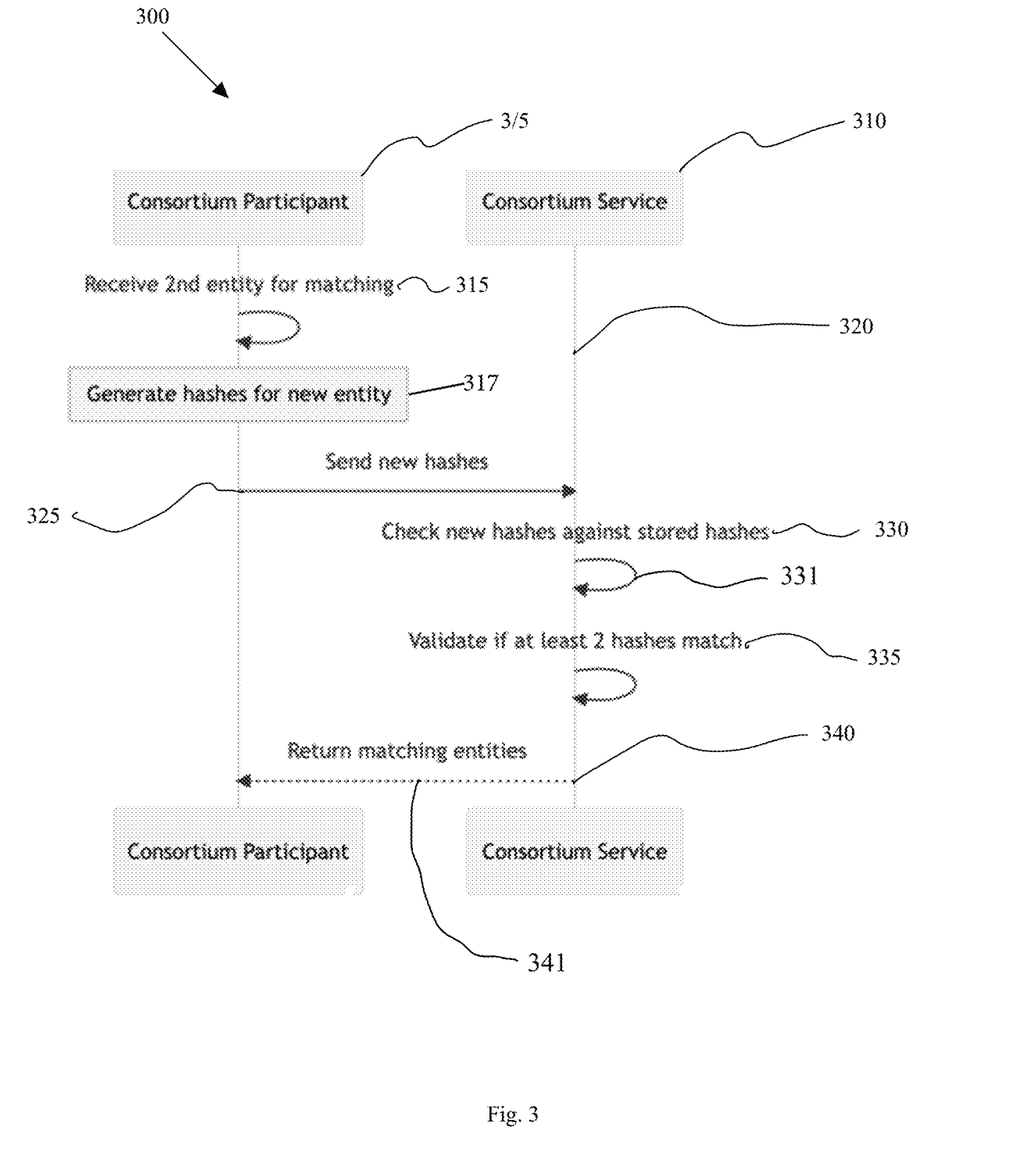
FIG. 3 is an illustration of one embodiment of matching workflow between participant and service.

FIG. 3 is an illustration of one embodiment of a matching workflow between participant and service, which may be referred to as a consortium hashing system. The consortium hashing system 300 may comprise a consortium participant 305 and a consortium service 310. The consortium participant 305 may receive a second entity 315 to determine if there is a match between the second entity 315 and one or more stored hashes. In some embodiments, stored hashes may be stored by the consortium service 310 and represent individual entities, such that the stored hashes may have been generated by the client-side hashing generation shown in FIG. 2. As used herein, the term "second" in second entity 315 is relative to a "first" entity that is the individual entities represented by stored hashes.

The consortium hashing system 300 may then generate new entity hashes 317 and then send the new entity hashes 325 to the consortium service 310. The consortium service 310 may then check the new entity hashes against stored hashes 330 to validate if at least two hashes match 335. In one embodiment, the two hashes validated, or determined, to match may include the generated new entity hash and a stored hash on the consortium service 310. In some embodiments, the generated new entity hash may be stored by the consortium service 310 for future use/validation against subsequent hashes. If in validating if at least two hashes match 335, matches are confirmed, the consortium service may return matching entities 340 to the consortium participant 305. In this way, it is possible for the consortium participant 305 to confirm that a specific entity exists on the consortium service 310, which may also confirm that the specific entity exists on a separate consortium participant. This may allow the consortium participant 305 to share information between entities having sensitive customer information. In one embodiment, this sharing of information may allow entities to confirm the presence of customers or individuals with other institutions.

Figure 4A:
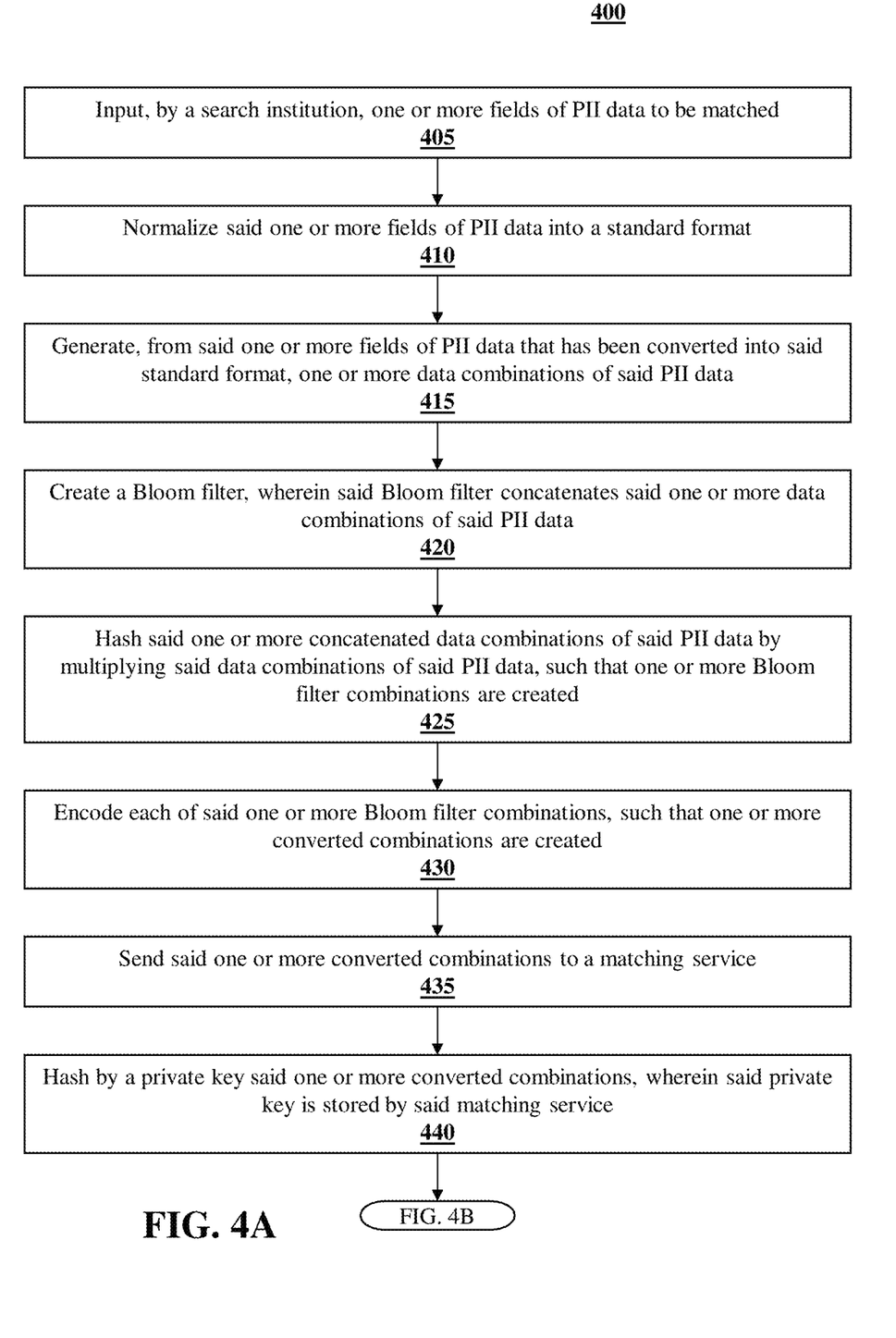
FIGS. 4A-B is a flow diagram showing one embodiment of a method for sharing Personal Identifying Information ("PII").
Figure 4B:
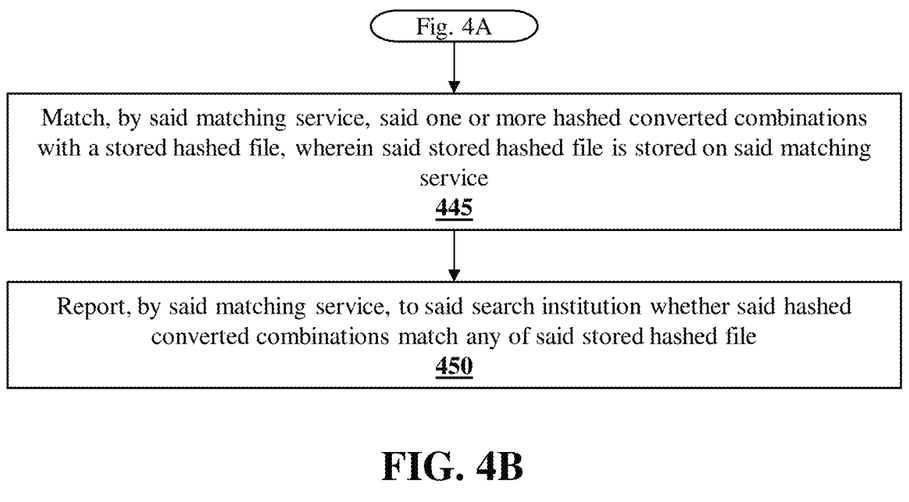

FIGS. 4A-B is a flow diagram showing one embodiment of a method for sharing Personal Identifying Information ("PII"). As shown in FIGS. 4A-B, the method for sharing Personal Identifying Information ("PII") 400 may comprise the steps: inputting, by a search institution, one or more fields of PII data to be matched 405; normalizing the one or more fields of PII data into a standard format 410; generating, from the one or more fields of PII data that has been converted into the standard format, one or more data combinations of the PII data 415; creating a Bloom filter, wherein the Bloom filter concatenates the one or more data combinations of the PII data 420; hashing the one or more concatenated data combinations of the PII data by multiplying the data combinations of the PII data, such that one or more Bloom filter combinations are created 425; encoding each of the one or more Bloom filter combinations, such that one or more converted combinations are created 430; sending the one or more converted combinations to a matching service 435; hashing by a private key the one or more converted combinations, wherein the private key is stored by the matching service 440; matching, by the matching service, the one or more hashed converted combinations with a stored hashed file, wherein the stored hashed file is stored on the matching service 445; and reporting, by the matching service, to the search institution whether the hashed converted combinations match any of the stored hashed file 450.

In some embodiments, the PII may comprise one or more of: a social security number, a full name, an email address, a phone number, a passport information, a driver's license number, a financial account number, a routing number, and a credit card number.

In some embodiments, the standard format may comprise: a name, wherein one or more characters of the name are converted to lowercase and spaces are removed; a date of birth, wherein the date of birth comprises a year, a month, and a day, wherein the year is a four-digit year, wherein the month is a two-digit month, and wherein the day is a two-digit day, and wherein the date of birth is formatted as year, month, day; a phone number, wherein all non-numerical characters are removed; an email address, wherein the email address comprises a plurality of characters, wherein the characters are converted to lowercase characters; and a social security number, wherein any non-numerical characters of the social security number are removed; a bank account number, wherein all non-numerical characters are removed and the number itself is between 9 and 12 digits; a routing number, wherein all non-numerical characters are removed and the number itself is 9 digits.

In some embodiments, the generating may comprise an algorithm that generates the one or more combined fields of PII, such that one or more combined fields of PII comprise all possible combinations of the one or more fields of PII data.

In some embodiments, the private key may be a HMAC-SHA256 type key.

In some embodiments, hashing the one or more concatenated data combinations may comprise a MurmurHashing protocol.

In some embodiments, the encoding each of the one or more Bloom filter combinations may comprise a Base64encoding protocol.

In some embodiments, the search institution may be a financial technology company, financial institution, or crypto exchange. In other embodiments, the search institution may be substantially any entity in possession of PII.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

Some portions of the preceding detailed descriptions have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the present disclosure, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The processes or methods depicted in the figures may be performed by processing logic that comprises hardware (e.g., circuitry, dedicated logic, etc.), firmware, software (e.g., embodied on a non-transitory computer readable medium), or a combination thereof. Although the processes or methods are described above in terms of some sequential operations, it should be appreciated that some of the operations described may be performed in a different order. Moreover, some operations may be performed in parallel rather than sequentially.

In addition, the various illustrative logical blocks, modules, and circuits described in connection with certain embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Operational embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

In one embodiment, this method may allow one entity to determine if an individual, based on their PII, is present on another entity's platform.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A method of sharing Personal Identifying Information ("PII") comprising the steps:
   inputting, by a search institution, one or more fields of PII data to be matched;
   normalizing said one or more fields of PII data into a standard format;
   generating, from said one or more fields of PII data that has been converted into said standard format, one or more data combinations of said PII data;
   creating a Bloom filter, wherein said Bloom filter concatenates said one or more data combinations of said PII data;
   hashing said one or more concatenated data combinations of said PII data by multiplying said data combinations of said PII data, such that one or more Bloom filter combinations are created;
   encoding each of said one or more Bloom filter combinations, such that one or more converted combinations are created;
   sending said one or more converted combinations to a matching service;
   hashing by a private key said one or more converted combinations, wherein said private key is stored by said matching service;
   matching, by said matching service, said one or more hashed converted combinations with a stored hashed file, wherein said stored hashed file is stored on said matching service; and
   reporting, by said matching service, to said search institution whether said hashed converted combinations match any of said stored hashed file.

2. The method of sharing PII of claim 1, wherein said PII comprises one or more of: a social security number, a full name, an email address, a phone number, a passport information, a driver's license number, a financial account number, and a credit card number.

3. The method of sharing PII of claim 1, wherein said standard format comprises:
   a name, wherein one or more characters of said name are converted to lowercase and any spaces are removed;
   a date of birth, wherein said date of birth comprises a year, a month, and a day, wherein said year is a four-digit year, wherein said month is a two-digit month, and wherein said day is a two-digit day, and wherein said date of birth is formatted as year, month, day;
   a phone number, wherein any non-numerical characters are removed;
   an email address, wherein said email address comprises a plurality of characters, wherein said characters are converted to lowercase characters;
   a social security number, wherein any non-numerical characters of said social security number are removed;
   a bank account number, wherein any non-numerical characters of said bank account number are removed; and
   a routing number, wherein any non-numerical characters of said routing number are removed.

4. The method of sharing PII of claim 1, wherein said generating comprises an algorithm that generates said one or more combined fields of PII, such that one or more combined fields of PII comprise all possible combinations of said one or more fields of PII data.

5. The method of sharing PII of claim 1, wherein said private key is a HMAC-SHA256 type key.

6. The method of sharing PII of claim 1, wherein said hashing said one or more concatenated data combinations comprises a MurmurHashing protocol.

7. The method of sharing PII of claim 1, wherein said encoding each of said one or more Bloom filter combinations comprises a Base64encoding protocol.

8. The method of sharing PII of claim 1, wherein said search institution is a financial technology company, financial institution, or crypto exchange.

9. A method of sharing Personal Identifying Information ("PII") comprising the steps:
   inputting, by a search institution, one or more fields of PII data to be matched;
   normalizing said one or more fields of PII data into a standard format;
   generating, from said one or more fields of PII data that has been converted into said standard format, one or more data combinations of said PII data;
   creating a Bloom filter, wherein said Bloom filter concatenates said one or more data combinations of said PII data;
   hashing said one or more concatenated data combinations of said PII data by multiplying said data combinations of said PII data, such that one or more Bloom filter combinations are created;
   encoding each of said one or more Bloom filter combinations, such that one or more converted combinations are created;
   sending said one or more converted combinations to a matching service;
   hashing by a private key said one or more converted combinations, wherein said private key is stored by said matching service;
   matching, by said matching service, said one or more hashed converted combinations with a stored hashed file, wherein said stored hashed file is stored on said matching service;
   reporting, by said matching service, to said search institution whether said hashed converted combinations match any of said stored hashed file;
   wherein said PII comprises one or more of: a social security number, a full name, an email address, a phone number, a passport information, a driver's license number, a financial account number, and a credit card number;
   wherein said standard format comprises:
      a name, wherein one or more characters of said name are converted to lowercase and any spaces are removed;
      a date of birth, wherein said date of birth comprises a year, a month, and a day, wherein said year is a four-digit year, wherein said month is a two-digit month, and wherein said day is a two-digit day, and wherein said date of birth is formatted as year, month, day;
      a phone number, wherein any non-numerical characters are removed;
      an email address, wherein said email address comprises a plurality of characters, wherein said characters are converted to lowercase characters;
      a social security number, wherein any non-numerical characters of said social security number are removed;

a bank account number, wherein any non-numerical characters of said bank account number are removed; and a routing number, wherein any non-numerical characters of said routing number are removed;

wherein said generating comprises an algorithm that generates said one or more combined fields of PII, such that one or more combined fields of PII comprise all possible combinations of said one or more fields of PII data;

wherein said private key is a HMAC-SHA256 type key;

wherein said hashing said one or more concatenated data combinations comprises a MurmurHashing protocol;

wherein said encoding each of said one or more Bloom filter combinations comprises a Base64encoding protocol; and wherein said search institution is a financial technology company, financial institution, or crypto exchange.

* * * * *